C. BATES.
Rotary-Harrow.
No. 63,199. Patented Mar 26, 1867.
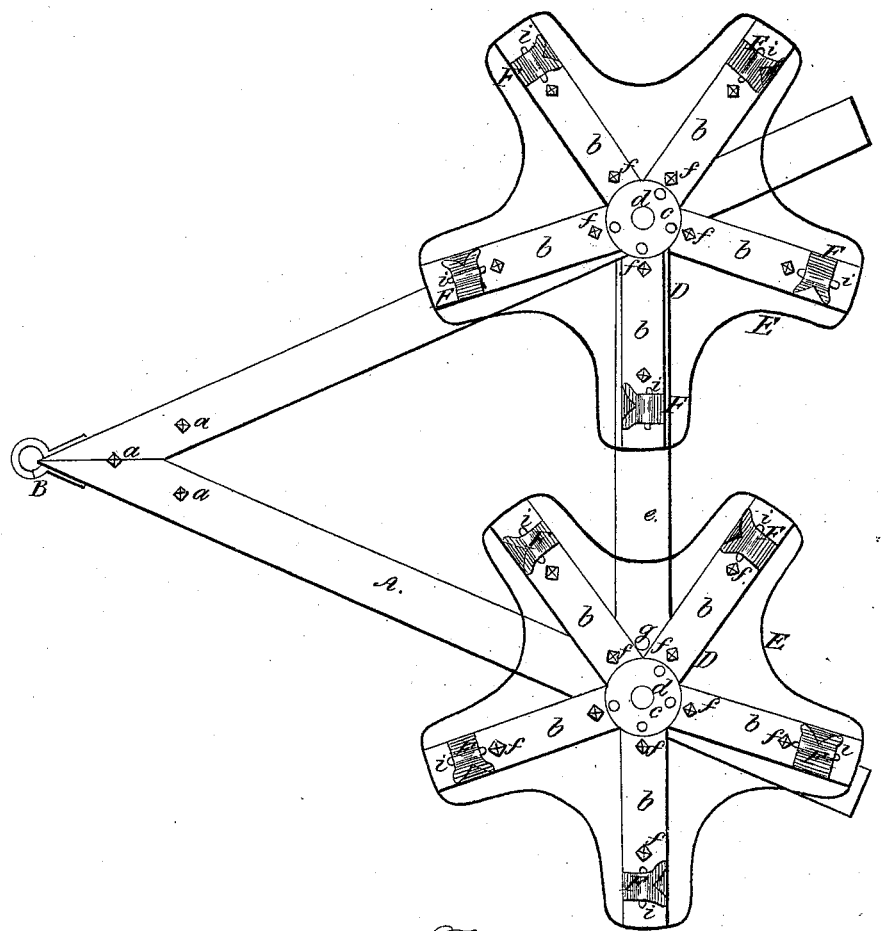
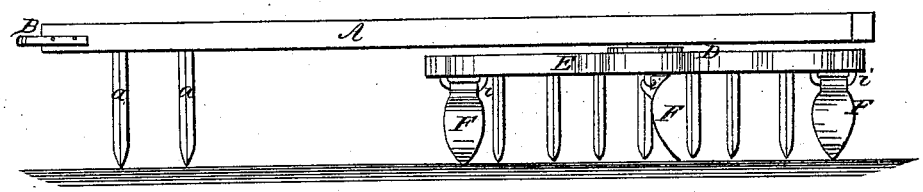
Witnesses:
Jas. A. Service
J. W. B. Covington
Inventor:
Caleb Bates
per Murry & Co.
Attys.

United States Patent Office.

CALEB BATES, OF KINGSTON, MASSACHUSETTS.

Letters Patent No. 63,199, dated March 26, 1867.

IMPROVEMENT IN ROTARY HARROWS.

*The Schedule referred to in these Letters Patent and making part of the same.*

TO ALL WHOM IT MAY CONCERN:

Be it known that I, CALEB BATES, of Kingston, in the county of Plymouth, and State of Massachusetts, have invented a new and improved Harrow; and I do hereby declare that the following is a full, clear, and exact description thereof, which will enable others skilled in the art to make and use the same, reference being had to the accompanying drawings, forming part of this specification, in which—

Figure 1 is an inverted plan or under view of my invention.

Figure 2, a side view of the same.

Similar letters of reference indicate like parts.

This invention relates to a new and improved harrow of that class which are arranged with a revolving toothed portion, and are commonly termed revolving harrows. The invention consists in the application of pivoted or swinging blades to the revolving portion or portions, whereby said portions are made to rotate under the draught movement of the implement. The invention also consists in constructing the revolving portions in such a manner that they may be made to gear into each other like toothed wheels, so as to insure a simultaneous movement or rotation of both portions.

A represents the frame of the harrow, constructed of triangular or V-form, with a clevis, B, at one end to which the whiffle-tree or splinter-bar is attached. Three harrow teeth, $a$, are inserted in this front end of the frame A. D D represent two revolving harrows, composed each of a series of radial arms, $b$, attached to a hub, $c$, the journals or axis $d$ of which pass through the rear bar $e$ of the frame A. Through the arms $b$ harrow teeth $f$ are driven, any proper number passing through each arm. To the outer ends of the arms $b$ of each harrow D a metal bar, E, is attached, and these bars E are bent or curved to form tooth-like projections, as shown clearly in fig. 1, so that when the harrows D are adjusted sufficiently near together they may gear into each other like toothed wheels, and a simultaneous rotation of both harrows D D insured. The bar $e$ has a number of holes, $g$, made in it, in line with each other, to admit of the journals or axes $d$ being inserted in any of them, to admit of the harrows being adjusted in or out of gear with each other as occasion may require. To the arms $b$ of each harrow D, and near the outer ends of said arms, there are attached blades F by means of joints, which joints may be composed of staples $i$ driven into the under sides of the arms and passing through the blades at their upper parts, the upper ends of the blades extending above or beyond the staples $i$, so that they may bear against the under sides of the arms, and serve to hold or retain the blades and prevent them from swinging back at one side of the harrows while they are allowed to swing back at the opposite side. By this arrangement the lower ends of the blades F are made to catch into the earth at one side of the harrows and pass freely over it at the opposite side under the draught movement of the implement, and the rotation of the harrows D D thereby insured. This harrow is of easy or light draught, and cannot readily become clogged with sods, weeds, or trash, for the rotation of the parts D D being insured, said parts will have a tendency to clear themselves of all obstructions.

Having thus described my invention, I claim as new, and desire to secure by Letters Patent—

The combination and arrangement of the arms $b$, axis $d$, perforated rear bars $e$, curved bar E, and swinging blades F, constructed and operating substantially as described, for the purpose specified.

CALEB BATES.

Witnesses:
WM. F. MCNAMARA,
ALEX. F. ROBERTS.